April 24, 1934.   N. R. KRAUSE   1,956,074
LUBRICANT DISPENSER
Filed Jan. 30, 1933
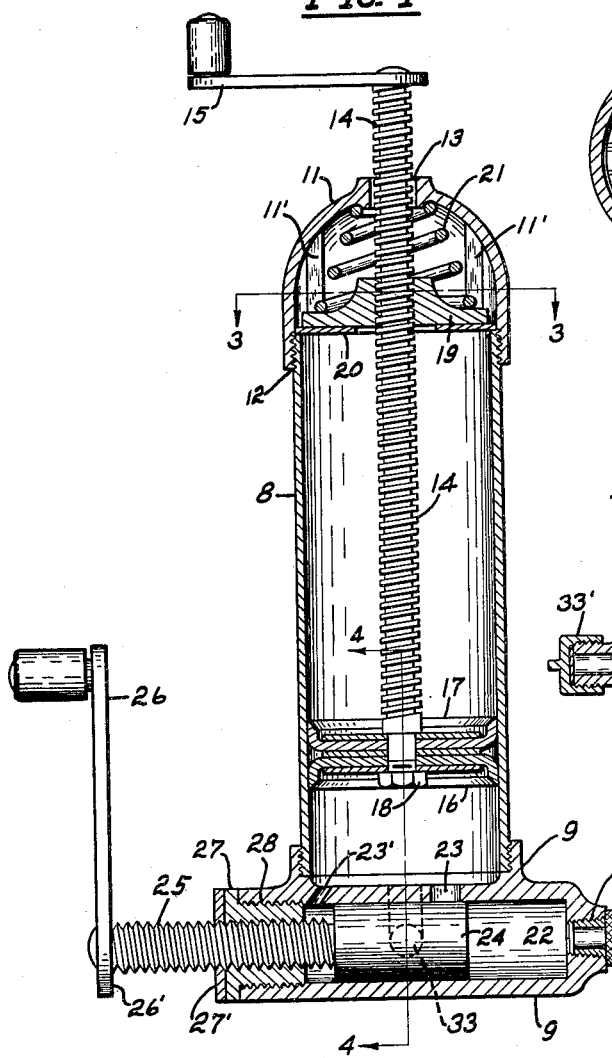
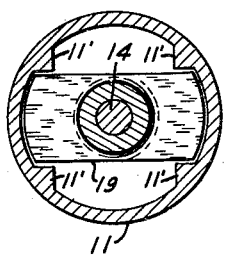
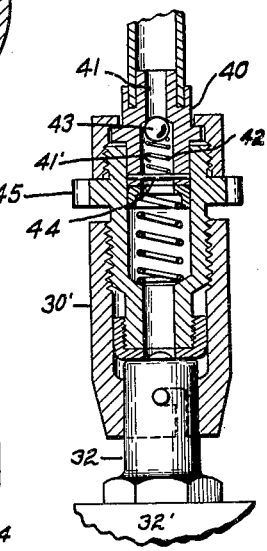
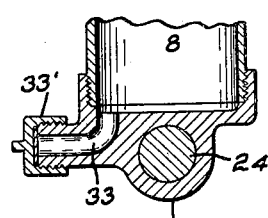
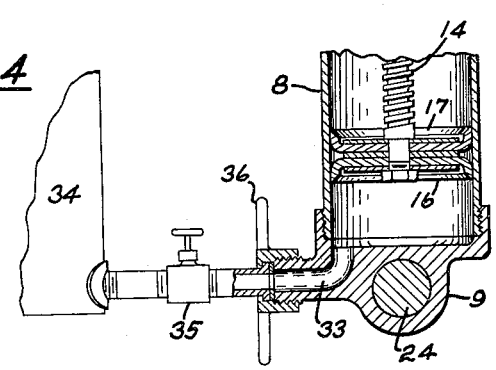
INVENTOR.
NORMAN R. KRAUSE
BY James A. Walsh
ATTORNEY Patented Apr. 24, 1934

1,956,074

UNITED STATES PATENT OFFICE 1,956,074

LUBRICANT DISPENSER

Norman R. Krause, Racine, Wis.

Application January 30, 1933, Serial No. 654,155

11 Claims. (Cl. 221—47.3)

My invention relates to lubricant dispensers for general use, and which are especially adapted for lubricating motor vehicle and machine parts, my objects being to provide a unitary reservoir and pump mechanism, the reservoir including means for expelling a large quantity of lubricant under comparatively low pressure and a pumping mechanism having means for projecting the lubricant under higher pressure when the dispenser is coupled to a receiving element of high resistance; to provide a simple and efficient lubricant dispenser which will readily function to discharge the lubricant, and also to charge or refill the reservoir so that the employment of other pressure charging apparatus for loading the reservoir, as is common, will be unnecessary; to provide a dispenser which will efficiently function to expedite the transfer of fluid or semi-fluid lubricant from bulk sources of supply to parts requiring lubrication without soiling the hands of the operator or exposing the lubricant to contamination from extraneous matter; and which improvement includes further novel means whereby the high pressure pump piston will function as a valving means for controlling the flow of lubricant from the main reservoir.

In the accompanying drawing, forming part hereof,

Figure 1 is a sectional view of my improved lubricant dispenser showing in detail the construction thereof.

Fig. 2, a detail of the type of receiving element for which this dispenser is adapted.

Fig. 3, a sectional view taken on the dotted lines 3—3 in Fig. 1.

Fig. 4, a sectional view taken on the dotted lines 4—4 in Fig. 1, and which also shows the dispenser attached to a large container of lubricant for replenishing the reservoir of the dispenser.

Fig. 5 is a view similar to Fig. 4, showing means for closing the charging duct of the dispenser.

Fig. 6 is a detail section taken on the dotted line 6—6 in Fig. 1.

In said drawing the numeral 8 indicates a cylindrical reservoir, one end of which is screwed into a pump body 9 and the opposite end of which is fastened to a cap 11, as at 12, said cap having an aperture 13 for a screw rod 14 having a handle 15, and also plungers 16 and 17 secured thereto at its inner end by a nut 18 as is common practice. The screw-rod 14 operates in a nut 19 which is sildably mounted within the cap 11 by means of the projecting webs 11', and is trapped within the cap by the washer 20 or equivalent wall and a spring 21 for a purpose to appear.

The pump body 9 comprises a cylinder 22 positioned at right angles to and having communication with the reservoir 8 by means of a port 23. Within the cylinder is a piston 24 operated by means of a threaded stem 25 connected to or formed integrally therewith, and which is actuated by the handle 26 attached to said stem as shown. The stem 25 operates in a suitable threaded bushing or nut 27 which is secured to the pump body, as at 28. At the discharge end of the cylinder 22 I attach a flexible conduit 30, at 31, said conduit terminating in a nozzle 30' adapted to be coupled to a receiving element or fitting 32 of a suitable or well known construction. At one side of the pump body I provide means for charging the reservoir with lubricant in a manner to be disclosed, such means consisting of a duct 33 communicating with the reservoir, and having threaded means for coupling it to a suitable source of supply 34.

The operation of my improved dispenser is as follows: The preferred method for charging the reservoir with lubricant is shown in Fig. 4. The plungers 16 and 17 are positioned adjacent the pump end of reservoir. The cap 33' is removed from duct 33 and the dispenser is coupled to a large container, 34, of lubricant, said container having suitable valve and coupling means, as at 35 and 36 respectively. When the coupling has been completed, the valve 35 is opened, the screw-rod 14 is then manipulated so as to cause the plungers 16 and 17 to move away from the pump body and said plungers, being mounted on said rod in reverse relation, create a vacuum in the reservoir by which the lubricant from the large container 34 is drawn thereinto. It will therefore be understood that by employing this method of transferring lubricant from a container to the reservoir 8 I eliminate all possibility of the lubricant becoming exposed to foreign matter, which is detrimental to bearings being lubricated, and which simple method expedites the filling of the reservoir. After the reservoir has been filled the dispenser is uncoupled from the container and cap 33' is replaced as shown in Fig. 5.

During the process of lubricating various types of machinery, some points require a large quantity of lubricant with comparatively low pressure while other points require a small quantity necessitating a powerful pressure to force it into the bearing being lubricated. After the nozzle has been coupled to the receiving element 32, and assuming a large quantity of lubricant is required, the piston 24 is withdrawn sufficiently to uncover the port 23 which permits the lubricant to flow from the reservoir 8 into the cylinder 22. The screw-rod 14 is manipulated so as to cause the plungers 16 and 17 to move towards the pump body. As the plunger moves it forces the lubricant out of the reservoir through the port 23 into cylinder 22 and through conduit 30 and fitting 32 into bearing 32' which offers comparatively little resistance. Where it is impossible to force the lubricant into the bearing by means of the large plunger as described, it is highly desirable to have a high pressure or "boosting" mechanism integral with the low pressure mechanism so as to eliminate the use of auxiliary devices as commonly used, thereby facilitating the lubrication of a machine.

I accomplish this desired means by the use of the transverse screw-operated piston 24 of comparatively small diameter. When it is impossible to force the lubricant from the reservoir into the bearing 32' by the large plunger in the reservoir, and the operator continues to turn the screw-rod 14, the large plunger will cease to move forwardly and therefore the continued turning of the screw-rod will cause the nut 19 to move against the resistance of spring 21 until said nut has completely compressed said spring, after which it will be impossible to turn said rod.

By employing this construction I am enabled to store the energy of the spring in such a manner that a continual pressure will be transmitted to the lubricant in the reservoir, through the screw-rod and plunger 16, until sufficient lubricant has been expelled into cylinder 22 to allow nut 19 to move against stop washer 20. After an operator has caused the spring 21 to be compressed as described, the piston 24 is advanced so as to close port 23. As the piston continues in its advance toward the discharge end of cylinder 22 the trapped lubricant will be forced out into and through conduit 30 under very high pressure. This process is repeated until the bearing has the desired amount of lubricant forced into it. Incidently, any lubricant that might leak past piston 24 is returned to the reservoir through port 23' when said piston is moved rearwardly preparatory for another pressure stroke. I have found by actual practice that this port is necessary to prevent the lubricant being trapped and forced out between the threads on stem 25. When the dispenser is not in use it is desirable to screw the stem 25 until the portion 26' of handle 26 comes against gasket 27' thereby making a seal to prevent seepage of lubricant through the threads when the device has not been operated for a long period of time.

It will be noted that in the nozzle 30' I employ a collar 40 having an aperture 41 therethrough communicating with the conduit 30, said collar having an enlarged portion 42 in which a yielding check-valve 43 is mounted, the valve abutting the aperture 41 by the action of spring 41' held between the valve and an abutment 44 in said collar, the valve being normally closed by the spring. The object of said check-valve is to prevent a return flow of the lubricant forced through the nozzle into the fitting 32 so that a vacuum may be formed in the high pressure cylinder 22 during the return stroke of the piston 24. When projecting lubricant under high pressure through a flexible metal tube an appreciable amount of expansion takes place in the tube itself because of its flexibility, and unless this pressure is relieved by partly withdrawing the piston in the high pressure cylinder it is difficult to disconnect the nozzle or coupling element from the fitting 32, as well as causing considerable waste of lubricant at the time of release. The position of the check-valve 43 is therefore important relatively, and by locating this valve in the coupling or discharge end of the conduit the lubricant will not be trapped in the flexible tube between the coupling and the high pressure cylinder during the return stroke of the piston 24 and therefore the resiliency of the tube cannot react in the manner stated, but it will be understood that the valve in no way prevents the outward flow of lubricant, its purpose being to prevent a return of the lubricant into the conduit, so that a vacuum will be produced in the high pressure cylinder 22 when the piston is withdrawn for again loading the cylinder from the reservoir.

I claim as my invention:

1. A lubricant dispenser embodying a reservoir, a transverse wall therein, a movable nut adjacent the wall, a plunger in the reservoir, an operating rod connected to the plunger and extending through the wall and nut, a coil spring encircling the rod, a closure secured to the reservoir and enclosing the nut, spring and a portion of the rod, and a cylinder secured in transverse relation to the reservoir and having inlet and vent openings communicating with the latter for receiving lubricant from and returning a portion thereof into said reservoir.

2. In a lubricant dispenser embodying a reservoir, a wall therein, a nut adjacent the wall, a plunger in the reservoir, an operating rod connected to the plunger and extending through the wall and nut, a spring abutting the nut and encircling the rod, and a cap embodying guides within which the nut is positioned whereby upon actuation of the rod the nut will travel therealong and compress the spring against the cap.

3. In a lubricant dispenser, a reservoir, a cylinder secured to the reservoir in transverse relation thereto and having an inlet and a vent opening in its wall communicating with the reservoir, a resiliently controlled plunger in the reservoir for expelling lubricant through the inlet and into the cylinder, a rotatable piston in the cylinder for expelling lubricant therefrom, said piston having a screw-threaded stem and means thereon for actuating the same, and means connected to the cylinder for conducting the lubricant therefrom to a machine part.

4. In a lubricant dispenser, a reservoir having a duct extending therefrom, a cylinder secured to the reservoir and having an inlet communicating with the reservoir, means in the reservoir for withdrawing lubricant from a container through said duct into the reservoir and for expelling lubricant through the inlet, a piston in the cylinder controlling the inlet and for expelling lubricant from the cylinder, a conduit for receiving lubricant from the cylinder and conducting the same to a machine part, and means in the conduit outlet for preventing the return flow of lubricant through the conduit.

5. In a lubricant dispenser, a reservoir, a cylinder secured to the reservoir and having inlet and vent openings communicating with the reservoir, means in the reservoir for expelling lubricant therefrom through the inlet and into the cylinder, a piston in the cylinder for opening and closing the inlet and vent openings, and means for actuating said piston.

6. In a lubricant dispenser, a reservoir, a cylinder secured in transverse relation to the reservoir and having an inlet and a vent passage communicating with the reservoir, a plunger in the reservoir having a screw-rod extending therethrough for actuating the plunger, yielding means for controlling the action of the screw-rod, a piston in the cylinder having a screw-rod extending therethrough for actuating the piston to expel lubricant received from the reservoir, a nut in the cylinder through which said piston screw-rod is rotated, a conduit connected to the cylinder for conveying lubricant, and a nozzle on the conduit adapted to engage a machine part for applying thereto lubricant conveyed by the conduit.

7. In a lubricant dispenser, a lubricant containing reservoir, a cap closure embodying guides adapted to be secured to the reservoir, a nut in the cap adapted to travel along the guides, a spring compressible and expansible between the nut and cap, a plunger in the reservoir, and a screw-rod connected to the plunger and extending through the nut, spring and closure for actuating the plunger to expel lubricant from the reservoir to means for discharging the same under high pressure.

8. In a lubricant dispenser, a reservoir, a closure therefor, a resiliently controlled plunger in the reservoir having a screw-rod extending through the closure, means on the rod for actuating the same and the plunger to expel lubricant from the reservoir, a cylinder secured to the reservoir having a nut therein, a washer adjacent the nut, a piston in the cylinder having a screw-rod extending through the nut and washer, means on the latter screw-rod adapted when said rod is sufficiently advanced in the cylinder to engage the washer against the nut to form a seal to prevent seepage of lubricant outwardly through said parts, means on the rod for actuating the same to expel lubricant from the cylinder, and a conduit for conducting lubricant to a machine part.

9. In a lubricant dispenser embodying a reservoir, a cylinder secured to the reservoir and having an inlet and a vent opening communicating with the reservoir, a duct in the cylinder communicating with the reservoir and leading to a source of supply, screw means in the reservoir for withdrawing lubricant from a container through said duct into the reservoir and for expelling lubricant through the inlet, and a piston in the cylinder controlling the inlet and for expelling lubricant from the cylinder.

10. In a lubricant dispenser embodying a reservoir, a cylinder secured to the reservoir and having inlet and vent openings therein communicating with the reservoir and a duct communicating directly with the reservoir and leading to a source of supply, means in the reservoir for withdrawing lubricant from a supply source through said duct into the reservoir and for expelling lubricant through the inlet into the cylinder, and a piston in the cylinder controlling the inlet and for expelling lubricant from the cylinder.

11. In a lubricant dispenser embodying a reservoir, a cylinder secured to the reservoir and having inlet and vent openings communicating with the latter, a resiliently controlled screw plunger in the reservoir for expelling lubricant through the inlet into the cylinder, and a rotatable piston in the cylinder controlling the inlet and for expelling lubricant from the cylinder.

NORMAN R. KRAUSE.